United States Patent

McIntosh

[11] Patent Number: 5,106,493
[45] Date of Patent: Apr. 21, 1992

[54] GRAY-WATER RECLAMATION AND REUSE SYSTEM

[76] Inventor: Todd McIntosh, 1400 Havenhurst Dr., Brea, Calif. 92621

[21] Appl. No.: 649,472

[22] Filed: Feb. 1, 1991

[51] Int. Cl.$^5$ .............................................. B01D 21/24
[52] U.S. Cl. .................................. 210/100; 210/108; 210/167; 210/195.1; 210/296
[58] Field of Search ................ 210/106, 107, 108, 167, 210/768, 803, 805, 96.1, 97, 195.1, 195.3, 732, 767, 744, 100, 98, 195.2, 105, 296

[56] References Cited

U.S. PATENT DOCUMENTS

| | | | |
|---|---|---|---|
| 3,425,936 | 2/1969 | Culp et al. | 210/108 |
| 3,911,938 | 10/1975 | Wiltrout | 210/108 |
| 4,145,279 | 3/1979 | Selby, III | 210/108 |
| 4,228,006 | 10/1980 | Hanna | 210/195.1 |
| 4,317,732 | 3/1982 | Shoquist | 210/106 |
| 4,828,709 | 5/1989 | Houser et al. | 210/195.1 |

OTHER PUBLICATIONS

"Alteration of in House Wastewater Flow with Low Flush Toilet Fixtures and Graywater Recycle" Boyle, W. C., Siegrist, R. L. & Anderson, P.L. 1982 Reidel Pub. Co.

Primary Examiner—Robert A. Dawson
Assistant Examiner—Ana Fortuna
Attorney, Agent, or Firm—Walter A. Hackler

[57] ABSTRACT

A gray-water reclamation and reuse system for collecting, filtering and storing waste water (i.e., gray-water) for reuse where potable quality water is not required comprises a sump for collecting the waste water; a filter connected for filtering the waste water collected in the sump; a tank for holding the filtered filtered waste water; and plumbing and electrically-operated valves for providing waste water to said sump from one or more waste water sources, including shower stalls, bathtubs, sinks and/or clothes washers, the valves being operable by electric controls for diverting the waste water from the sources between the sump and a conventional waste water drain pipe to a sewer, septic tank or the like. A first pump is included for pumping waster water from the sump into and through the filter and into the holding tank and a second pump is included for pumping filtered waste water from the holding tank to one or more recycling uses such as toilet tanks, hose bibs, and/or lawn sprinklers. Another pump is provided for chlorinating waste water in the holding tank. Other electrically-operated valves and plumbing are included for enabling the adding of non-waste water to the holding tank as make-up water and for enabling the back washing of the filter. Electric controls, including a microprocessor, are included for controlling the operation of the various valves and pumps for START UP, NORMAL OPERATION, and BACK WASH modes of operation of the system. In a variation, a replacement stopper is provided for shower stalls and bathtubs; a suction pump and plumbing draw waste water from the shower stall or bathtub to the sump.

17 Claims, 4 Drawing Sheets

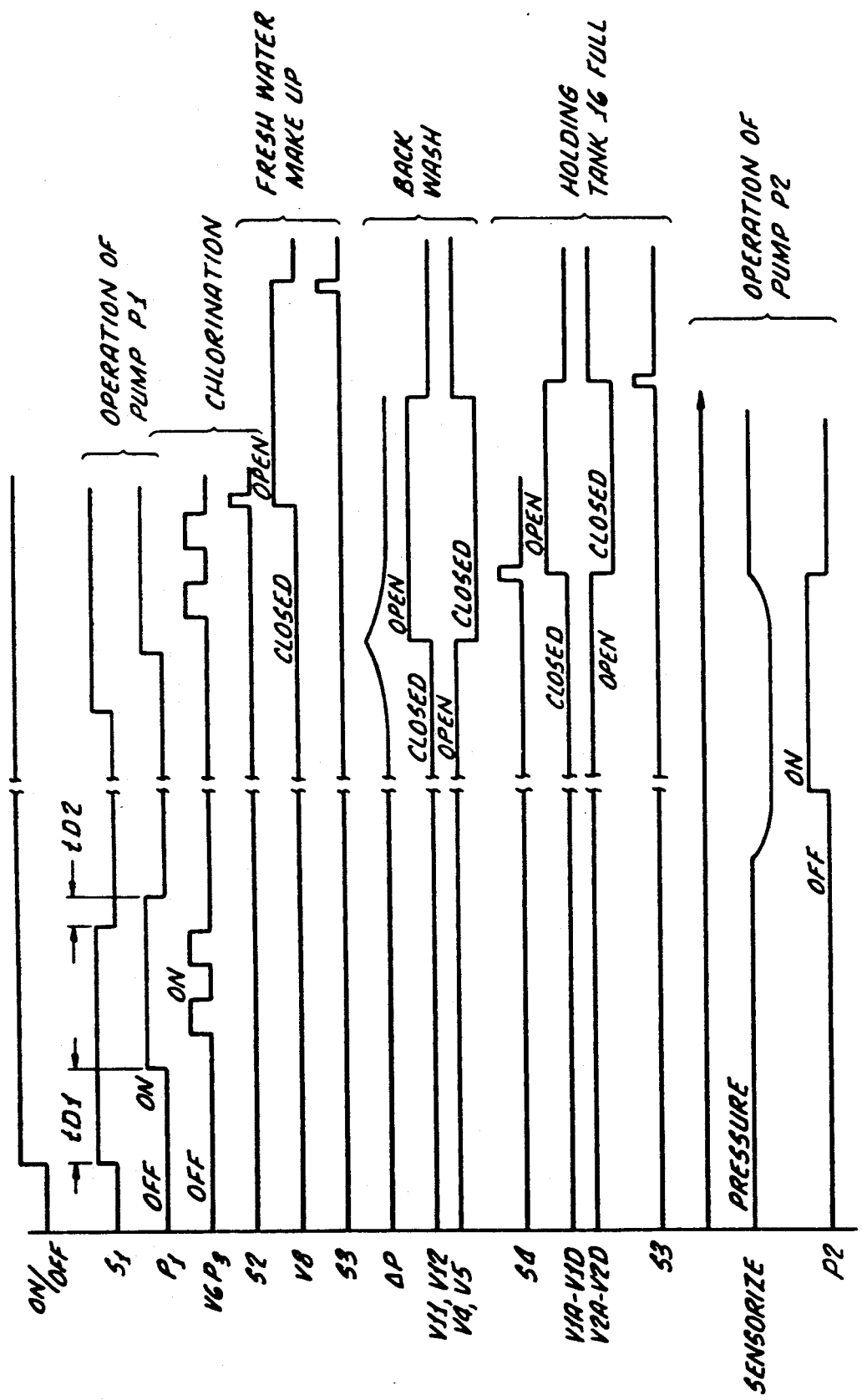

GRAY-WATER RECLAMATION AND REUSE SYSTEM

BACKGROUND OF THE INVENTION:

1. Field of the Invention

This invention relates generally to the field of water conservation systems and, more particularly, to systems for recycling waste water, referred to generally as "gray-water."

2. Background Discussion

Chronic, and often severe, water shortages exist in many parts of the United States and elsewhere in the world. Such water shortages, for example in the Southwestern United States, are growing more acute from year to year as a result of natural population increase and the southwestern shift of population from Eastern and Northern States. The State of California has, as an illustration, presently suffered several years of unusually low rainfall and drought conditions are threatening agriculture, industry, businesses and homeowners. Cities such as Santa Barbara and Los Angeles have mandated water conservation practices and slow- or no-growth policies have been instituted in places because of the unavailability of water for new residences.

Although these water shortage problems may be ameliorated—in the short term—by several years of good rainfall, the long term prognosis is unfavorable considering the increases in population and the ever-increasing need for water. As a result, good water conservation practices are needed if water-scarce regions of the world are to prosper or even survive.

Some heavy water using industries have developed elaborate and expensive treatment facilities for reclaiming used water and reusing the water for industrial purposes. However, such facilities are extremely costly and have, therefore, generally been limited to large industries which can afford the cost, and especially those industries in which the cost of using reclaimed water is less than the cost of water supplied by local water districts or municipalities.

Few serious attempts have, however, been made by homeowners to reclaim gray-water and use if for lawns and the like. What attempts that have been made have usually involved using buckets to collect wash water and emptying the buckets on shrubs and flowers to keep them alive. Ordinarily, to the present inventor's knowledge, has there been any practical system for recycling the relatively large amounts of water used for showering and bathing and for washing clothes. Some problems associated with make-shift methods for reusing gray-water are health problems, and it is possible that in some areas the use of untreated wash water may be in violation of city ordinances or health codes. Moreover, untreated waste water with detergents and soaps may be detrimental to plants and shrubs. In any event, the physical problems of handling buckets of wash water can be expected to limit any serious use of such methods and the amount of fresh water saved by such methods is considered to be minimal considering the amount of fresh water that is used.

What is needed is a system for automatically collecting gray-water and making it available without any physical handling of the water by individuals needed and such that the amount of fresh water saved by the water reuse system is substantial and continual and the costs associated with the water reuse system—including installation cost and maintenance—is at least offset by reduced water bills.

It is the principal purpose of the present invention to provide such a system for reusing gray-water in a safe, economical and trouble-free manner, and for providing a system which works in a continual manner with minimal attention required. Such a system of the present invention is particularly suited for homes, apartments, hotels, motels, office buildings, small businesses, schools, and the like.

SUMMARY OF THE INVENTION

In accordance with the present invention, there is provided a gray-water reclamation and reuse system for the collecting, filtering and storing for reuse of waste water, especially domestic waste water from bathtubs, shower stalls, clothes washers and sinks. The system comprises a sump for collecting the waste water, filtering means for filtering waste water collected in the sump, and a tank, preferably operated substantially at ambient pressure, for holding the filtered waste water. Included in the system are means for providing waste water to the sump from one or more waste water sources, including shower stalls, bathtubs, sinks and/or clothes washers; first pumping means for pumping waste water from the sump into and through the filtering means and into the holding tank; and second pumping means for pumping filtered waste water from the holding tank for one or more recycling use locations, including a toilet tank, hose bib, and/or lawn sprinklers. Further included in the system are control means for controlling the operation of the first and second pumping means and the filtering means.

According to a preferred embodiment of the gray-water reclamation and reuse system, the means for providing waste water to the sump include means for diverting the waste water from the one or more sources between said sump and a conventional waste water drain pipe to a sewer, septic tank or the like, in which case, the control means are connected for controlling said diverting means.

In order to render the waste water sanitary, even though it is not intended to render the water potable, the gray-water reclamation and reuse system of the present invention preferably includes means for chlorinating waste water contained in the holding tank, the control means being preferably are connected for controlling the chlorination means.

For situations in which the reuse demand for waste water from the holding tank exceeds the amount of waste water provided to the holding tank (via thessump and filtering means), the system of the invention preferably includes means enabling the adding of non-waste water to the holding tank as make-up water, such means including connecting a non-waste water supply conduit to the holding tank. The control means are then connected for controlling the means for adding non-waste water to the holding tank.

In order to maintain the quality of waste water from the filtering means to the holding tank, it is preferred that the system include means for back washing the filtering means and for delivering the back wash water to an existing waste water drain pipe. In this case, the control means are connected for controlling the back-washing means.

For retrofitting existing bathtubs or shower stalls, especially in homes or the like which are built on concrete slab floors, the means for providing waste water to the sump may include waste water scavenging means adapted for inserting into a preexisting drain opening in a shower stall or bathtub.

The present system thereby advantageously conserves the use of fresh (that is, potable) water by reusing waste water from sinks, bath tubs, shower stalls, and clothes washers—which usually account for most of the fresh water used in homes and apartments—for applications such as flushing toilets and lawn and landscaping applications which do not require the use of potable water. Fresh water costs are thereby significantly reduced and, more importantly in many areas, fresh water is conserved.

BRIEF DESCRIPTION OF THE DRAWINGS

The present invention can be more readily understood from a consideration of the following detailed description when taken in conjunction with the accompanying drawings, in which:

FIG. 4 is timing diagram showing the operational timing of various ones of the valves and pumps of the gray-water reclamation and reuse system of FIG. 1.

DESCRIPTION OF THE PREFERRED EMBODIMENT

Figure 1:
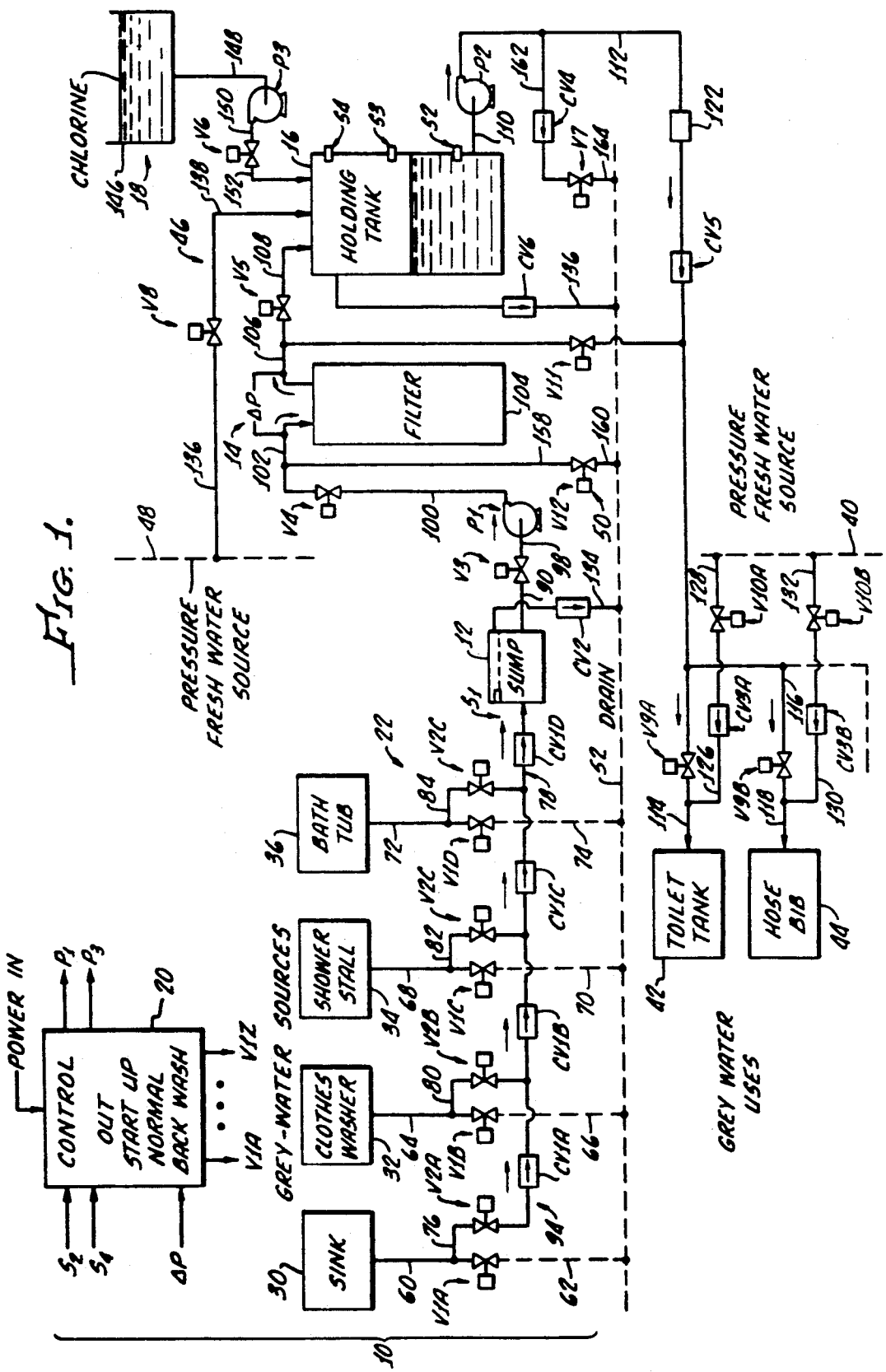
FIG. 1 is a schematic drawing of the gray-water reclamation and reuse system according to the present invention, showing a gray-water sump, filter, holding tank, and chlorinating means, showing associated plumbing, valves, pumps and controls therefor, gray-water flow arrows showing the system in its normal operation configuration.

Shown in FIG. 1, in accordance with the present invention, is a gray-water reclamation and reuse system 10 for reclaiming and reusing dirty water from such sources as shower stalls, bathtubs, sinks, clothes washers and other sources from which used—but not seriously contaminated—water is ordinarily discharged into a drain pipe leading to a sewer, septic tank, or the like. As used herein, the term "gray-water, is to be understood to mean waste water that may contain some dirt and usually soap or detergents but is not heavily contaminated water. System 10 of the present invention would, for example, not be used to reclaim and reuse water from toilets. Nor would system 10 ordinarily be used to reclaim and reuse water from automatic dishwashers since much of such water (except for rinse cycles) would usually be too contaminated with food particles and grease for satisfactory reuse—at least without excessive filtering and chemical treatment being needed. System 10 could, however, readily be adapted for reclaiming and reusing just rinse-cycle waste water from automatic dishwashers.

As shown in FIG. 1, and as more particularly described below, gray-water reclamation and reuse system 10 comprises generally a waste water sump 12, waste water filtering means 14, a filtered waste water holding tank 16, waste water chlorinating means 18, and control means 20. Connecting means, generally identified by reference number 22, are provided for supplying waste water to sump 12 from drain sources such a sink 30, a clothes washer 32, a shower stall 34, and a bathtub 36. In this regard, it is to be appreciated that the above-listed sources of waste water are given by way of example with no limitation being thereby intended or implied. In some instances only a single source of waste water may exist and in other cases there may be more sources, for example, from a number of sinks 30 or several shower stalls 34. Filtered waste water delivery means 40 are included for delivering filtered waste water, under pressure, from holding tank 16 to such using points as a toilet tank 42 and a hose connection or hose bib 44. Again, it is to be appreciated that the above-listed use points are given merely by way of example and no limitations are thereby intended or implied. Additional use points, such as a lawn sprinkler system, may be included and system 10 may supply filtered and treated gray-water to several toilets and/or hose bibs.

Further included in gray-water reclamation and reuse system 10 are fresh water make-up means 46 for adding fresh water (that is, non-waste water) from an existing fresh water pressure pipe or conduit 48 to holding tank 16 in the event that more water is required from the tank than can be provided by waste water from connecting means 22. In addition, system 10 includes filter back washing means 50 for the periodic back flushing of filtering means 14 into a preexisting drain pipe or conduit 52. As described below, a number of electrically-controlled (that is, solenoid-operated) valves, one-way flow (check) valves, sensors, pumps and conduits are included in system 10.

More particularly described, connecting means 22 for providing waste water from sink 30, clothes washer 32, shower stall 34 and bathtub 36 (and the like) to sump 12 comprise a normally open (N.O.) drain valve V1A which is connected between a water pipe or conduit 60 to the drain of sink 30 and a conduit or pipe 62 to preexisting drain pipe 52. In a similar manner. a N.O. valve V1B is connected between conduits 64 and 66 which connect the drain of clothes washer 32 to drain pipe 52; a N.O. valve V1C is connected between conduits 68 and 70 which connect the drain of shower stall 34 to the drain pipe; and a N.O. valve V1D is connected between conduits 72 and 74 which connect the drain of bathtub 36 to the drain pipe.

Connected in parallel with valves V1A-V1D are corresponding normally closed (N.C.) valves V2A-V2D. Valve V2A is connected between a conduit or pipe 76, which tees into conduit 60 from sink 30, and a common conduit or pipe 78 which discharges into sump 12. Similarly, valve V2B is connected between a conduit 80, which tees into conduit 64 from washer 32, and common conduit 78; valve V2C is connected between conduit 82, which tees into conduit 68 from shower stall 34, and conduit 78; and valve V2D is connected between a conduit 84, which tees into conduit 72 from bathtub 36, to common conduit 78. Preferably, one-way (check) valves CV1A, CV1B, CV1C and CV1D are connected in series in conduit 78 downstream of valves V2A, V2B, V2C and V2D, respectively, to prevent any backflow of waste water into any of sink 32, washer 32, shower stall 34 and bathtub 36 in the event any of such valves fail to operate in the intended manner.

When valves V1A-V1D and open and valves V2A-V2D are closed, waste water is permitted to drain in a normal manner from sink 30, washer 32, shower stall 34 and bathtub 36 (as well as any other similarly connected sources of reusable wash water) into existing drain pipe 52. On the other hand, when valves V1A-V1D are closed and valves V2A-V2D are open waste water from sink 30, washer 32, shower stall 34 and bathtub 36 (as well as any other similarly connected sources of reusable waste water) drains into sump 12 (through check valves CV1A-CV1D) for reuse. Valves V1A-V1D and V2A-V2D can, collectively, be considered to comprise a waste water diverting means 94.

Although for ease in describing and understanding system 10, each pair of valves V1A,V2A-V1D,V2D is shown and described herein as comprising two separate valves, it is to be understood that a single three-way valve can be used in place of each such pair of valves and the use of such three-way valves is, in fact, the preferred implementation. Other paired valves wherein one valve of the pair is open when the other valve of the pair is closed can likewise be implemented by a single three-way valve.

A N.C. valve V3 is connected between a conduit or pipe 96 from the outlet of sump 12 and a conduit 98 to a first water pump P1. In turn, a N.O. valve V4 is connected between a conduit 100 from the outlet of pump P1 to a conduit or pipe 102 connected to the inlet of a filter 104 which comprises the major part of filtering means 14.

Connected between a conduit or pipe 106 from the outlet of filter 104 and a conduit or pipe 108 connected to a top of holding tank 16 is a N.O. valve V5. First pump P1 is operative for pumping waste water from sump 12 to and through filter 104 and into holding tank 16 (and through valves V3, V4, and V5) for reuse.

A conduit or pipe 110 is connected between a bottom outlet of holding tank 16 and the inlet of a second pump P2. Connected to the outlet of second pump P2 is a common conduit 112 which leads to a N.C. valve V9A, which is, in turn, connected to a conduit or pipe 114 which leads to the inlet of the water tank of toilet 42. A N.C. valve V9B is connected between a conduit to pipe 116, which is teed into conduit 112 upstream of valve V9A, and a conduit 118 leading to hose bib 44. A check valve CV5 is connected in conduit 112, upstream of valves V9A and V9B, to prevent and back flow of water into holding tank 16. Second pump P2 is thus operative for pumping filtered waste water from holding tank to toilet tank 42, hose bib 44, and other users of the filtered waste water, such a lawn sprinkler system (and through valves V9A and V9B and check valve CV5). The operation of second pump P2 is controlled, as more particularly described below, by a pressure sensor 122 installed in conduit 112 downstream of the pump.

Connected in parallel with valves V9A and V9B are N.O., anti-siphon valves V10A and V10B, respectively. Valve V10A is connected between a conduit or pipe 126, which is teed into conduit 114, and a conduit or pipe 128 which is connected to an existing fresh water pipe 48. Similarly, valve V10B is connected between a conduit or pipe 130, which is teed into conduit 18, and a conduit 132 connected to fresh water conduit 48.

Check valves CV3A and CV3B connected in respective conduits 126 and 130 assure, in conjunction with anti-siphon valves V10A and V10B, that no back flow of any filtered waste water into water pipe 48 occurs.

It is apparent that with an adequate supply of filtered waste water in holding tank 16 and with valves V10A and V10B closed and valves V9A and V9B open, filtered waste water is delivered, under pressure, by second pump P2 from the holding tank to toilet tank 42 and hose bib 44 (and to other similarly connected points of filtered and treated gray-water reuse). On the other hand, for example, when system 10 is out of service, with valves V10A and V10B open and valves V9A and V9B closed, pressurized fresh water is provided from water pipe 48 to toilet tank 42 and hose bib 44.

An overflow conduit 134 is connected from upper regions of sump 12 to drain conduit 52 and an overflow conduit 136 is connected from upper regions of holding tank 16 to the drain conduit. Check valves CV2 and CV6 in respective overflow conduits 134 and 136 prevent any back flow of water from drain conduit 52 into sump 12 and holding tank 16.

A N.C., anti-siphon valve V8 is connected between a conduit 138, which is connected to pressurized fresh water conduit 48, and a conduit 138, which is connected to a top inlet of holding tank 138. Operation of valve V8 causes fresh water to be fed from conduit 48 into tank 16 in the event there is insufficient filtered waste water in the tank to meet reuse demands. In this manner, the supply of filtered waste water is augmented by fresh water.

Although filtered waste water from holding tank 16 is not intended to be used as potable water, it is still desirable to chlorinate the filtered waste water before its use so reduce odors and to kill germs because individuals and domestic animals may come into contact with such water. Moreover, some local ordinances or codes may require that waste water intended for reuse be treated to kill germs and bacteria. To this end, a source of chlorine or chlorine precursor is provided in a small tank 146. A third pump P3 is connected between a conduit or pipe 148, which is connected to a lower outlet of tank 146, and a conduit or pipe 150, which is, in turn connected to a N.C. valve V6. The outlet of valve V6 is connected to a conduit or pipe 152 which is connected to a top inlet of holding tank 16. Third pump P3 functions to pump material from tank 146 into holding tank 16 to chlorinate filtered waste water therein.

Figure 2:
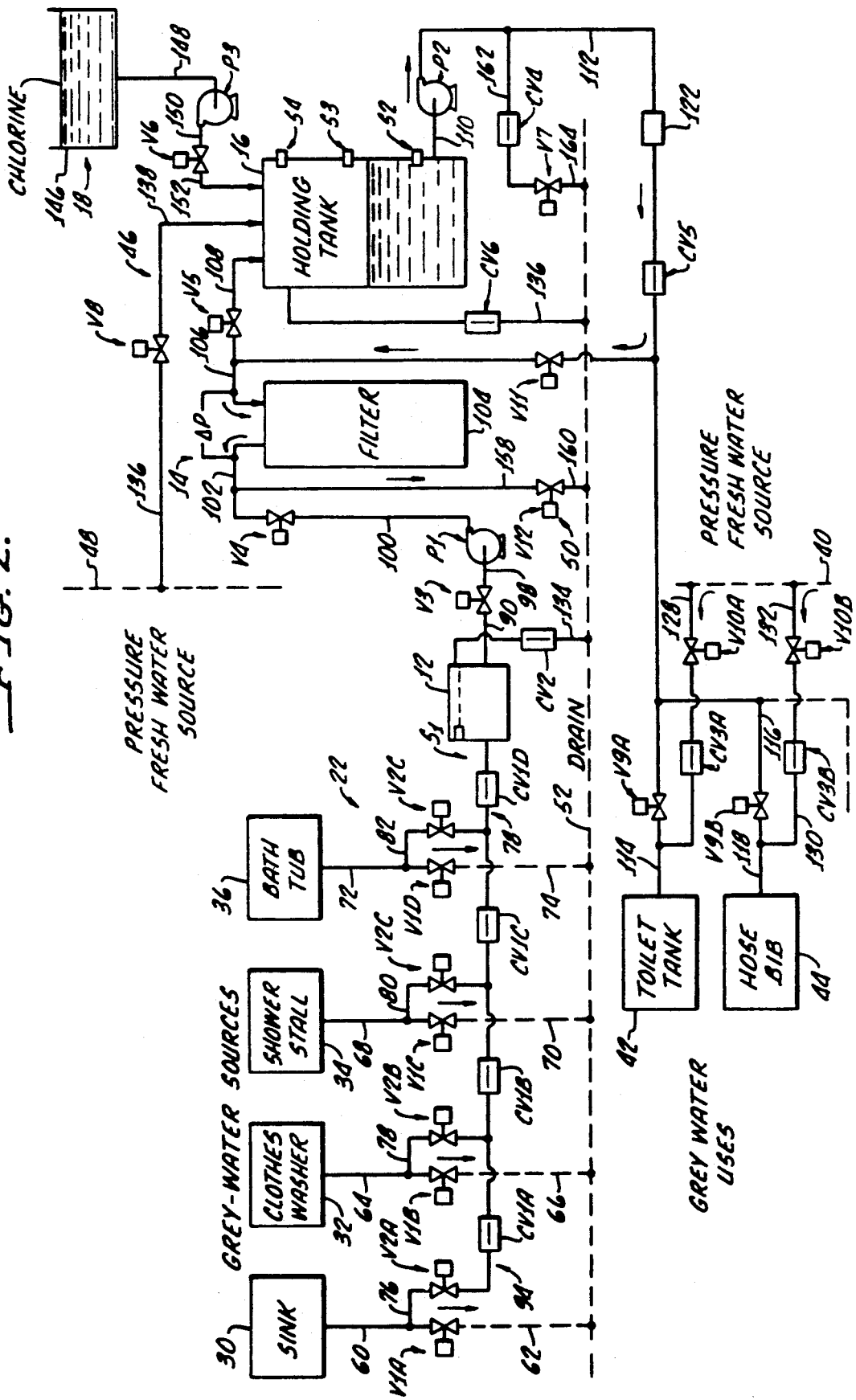
FIG. 2 is a schematic drawing of the gray-water reclamation and reuse system of FIG. 1, gray-water flow arrows indicating a mode of system operation for back washing of the filter.

Back washing (back flushing) of filter 104 is enabled by N.C. valves V11 and V-12 (as depicted in FIG. 2). Valve V11 is connected between a conduit 154, which is teed into conduit 112 (from second pump P2) and a conduit 156 which is teed into conduit 106 from filter 104. Valve V12 is connected between a conduit 158 which is teed into conduit 102 feeding into filter 104 and a conduit 160 which is teed into drain pipe 52. With valves V11 and V12 open and other valves (including valves V4, V5 and V9A and V9B) closed, second pump P2 pumps filtered waste water from holding tank 16 through filter 104 in the reverse direction and into drain pipe 52.

The pumping of filtered waste water from holding tank 16 into drain pipe 52 is enabled by a N.C. valve V7 which is connected between a conduit or pipe 162, which is teed into conduit 112 (downstream of second pump P2) and a conduit or pipe 164 which is teed into drain pipe 52. With valve V7 open and valves V9A and V9B closed, pump P2 can be operated to pump filtered waste water from holding tank 16 directly into drain pipe 52, as may be desired to empty such tank for servicing.

Level sensor S1-S4 are provided for sensing the level of waste water in sump 12 and holding tank 16 and for providing electrical signals to control means 20. As such, sensor S1 is connected to sump 12 for sensing an upper water level and sensors S2, S3, and S4 are connected to holding tank 16 to respectively sense low, intermediate and high water levels in the tank and to provide electric signals to control means 20. Preferably, to determine when back washing of filter 104 is needed, a pressure drop (delta P) is measured across the filter and an electric signal relating thereto is provided to control means 20.

Figure 3:
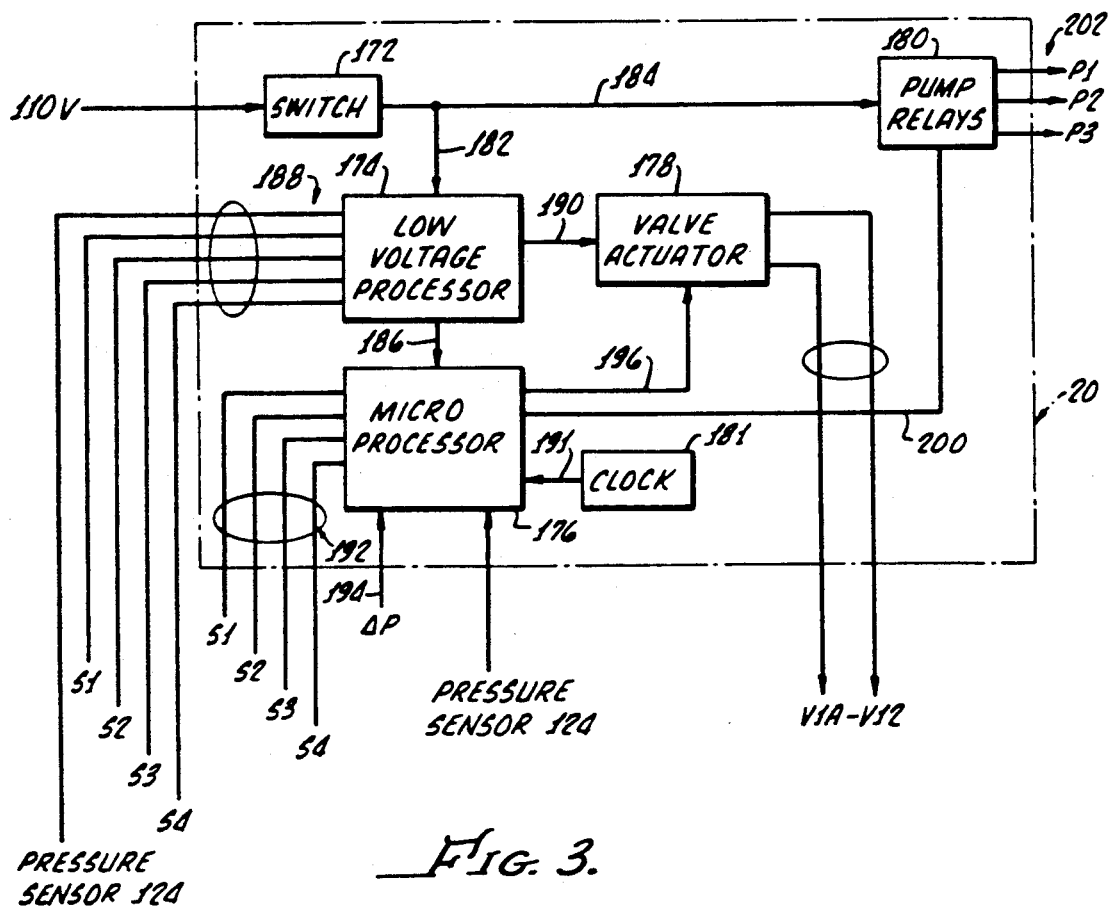
FIG. 3 is a simplified block diagram of the valve and pump control portion of the gray-water reclamation and reuse system of FIG. 1.

As depicted in FIG. 3, control means 20 comprise an actuating switch which is connected to line voltage (for example, 110 volts), a low voltage power supply 174, a microprocessor 176, valve actuating means 178, pump actuating relays 180 and clock 181. As shown, line voltage is provided, downstream of switch 172, to low voltage power supply 174 via a conduit 182. Line voltage is also provided to pump relays 180 via a conduit 184. Low voltage (for example, 12 volts) is provided, over a conduit 186, to microprocessor 176, to sensors S1-S4 over a multi-conduit 188, and to valve actuating means 178 via a conduit 190. Clock 181, provides timing signals to microprocessor 176 via a conduit 191 Microprocessor 176 receives signals from sensors S1-S4 over a multi-conduit 192 and a delta P signal over a conduit 194. Operating control signals are provided from microprocessor 176 to valve actuating means 178 via a conduit 196 and to pump operating relays 180 via a conduit 198. In response to instructions from microprocessor 176, valve actuating means sends valve operating voltage to valves V1A-V12 via a multi-conduit 200 and pump actuating relays send line voltage to pumps P1-P3 over a multi-conduit 202. Basically, in response to electrical signals from sensors S1-S4 and delta P, microprocessor 176 is programmed, in a manner known to those skilled in the microprocessor art, to cause, through valve actuating means 178 and pump relays 180, valves V1A-V12 to open or close in a particular sequence and to cause pumps P1-P3 to operate or stop operating, also in a particular sequence, both depending upon the mode of operation of control means 20.

Gray-water reclamation and reuse system 10 has four modes of operation: "OUT," "START UP," "NORMAL OPERATION," and "BACK FLUSH," all of which are controlled by control means 20. In the OUT mode, system is out of service and waste water from the various sources is drained into drain pipe 52 through valves V1A-V1D, and fresh water is provided to toilet tank 42 and hose bib 44 through valves V10A and V10B. In the START UP mode, waste water from the various sources is directed into sump 12 via valves V2A-V2D, but fresh water is still provided to toilet tank 42 and hose bib 44 through valves V10A and V10B. In the NORMAL OPERATION mode, waste water from the various sources is provided to sump 12 through valves V2A-V2D and filtered waste water from holding tank 16 is pumped to toilet tank and hose bib 44 (on demand) through valves V9A and V9B. In the BACK WASH mode, filtered waste water from tank 16 is pumped in a reverse direction through filter 104 to drain pipe 52 through valves V11 and V12.

The following TABLE shows the condition of valves V1A-V12 and pumps P1-P3 for the above-described four modes of system operation.

TABLE

| | VALVE/PUMP COND. FOR GRAY-WATER SYSTEM | | | |
|---|---|---|---|---|
| VALVE/PUMP REF. NO. | TYPE | INOPERATIVE | START UP | NORMAL OPERAT. | FILTER BACK WASH |
| V1A | N.O. | OPEN | CLOSED | CLOSED | OPEN |
| V1B | N.O. | OPEN | CLOSED | CLOSED | OPEN |
| V1C | N.O. | OPEN | CLOSED | CLOSED | OPEN |
| V1D | N.O. | OPEN | CLOSED | CLOSED | OPEN |
| V2A | N.C. | CLOSED | OPEN | OPEN | CLOSED |
| V2B | N.C. | CLOSED | OPEN | OPEN | CLOSED |
| V2C | N.C. | CLOSED | OPEN | OPEN | CLOSED |
| V2D | N.C. | CLOSED | OPEN | OPEN | CLOSED |
| V3 | N.C. | CLOSED | OPEN | OPEN | CLOSED |
| V4 | N.O. | OPEN | OPEN | OPEN | CLOSED |
| V5 | N.O. | OPEN | OPEN | OPEN | CLOSED |
| V6 | N.C. | CLOSED | INTERMIT. | INTERMIT. | CLOSED |
| V7 | N.C. | CLOSED | CLOSED | CLOSED | CLOSED |
| V8 | N.C. | CLOSED | CLOSED | INTERMIT. | CLOSED |
| V9A | N.C. | CLOSED | CLOSED | OPEN | CLOSED |
| V9B | N.C. | CLOSED | CLOSED | OPEN | CLOSED |
| V10A | N.O. | OPEN | OPEN | CLOSED | OPEN |
| V10B | N.O. | OPEN | OPEN | CLOSED | OPEN |
| V11 | N.C. | CLOSED | CLOSED | CLOSED | OPEN |
| V12 | N.C. | CLOSED | CLOSED | CLOSED | OPEN |
| P1 | | OFF | INTERMIT. | INTERMIT. | OFF |
| P2 | | OFF | OFF | INTERMIT. | ON |
| P3 | | OFF | INTERMIT. | INTERMIT. | OFF |

OPERATION

FIG. 4 depicts various sequencing operations of system 10 as controlled by microprocessor 176 of control means 20 during the NORMAL OPERATION and BACK WASH modes of operation. For example, during the NORMAL OPERATION mode, it is preferred that first pump P1, which pumps waste water from sump 12 into and through filter 104 is turned on after a preestablished turn-on time delay, $t_{Don}$, which may, for typical systems 10, be about three minutes, after the water level in the sump reaches the level of sensor S1; during this delay time, waste water ordinarily keeps flowing into the sump. Pump P1 is kept turned on (by control means 20) until the water level in sump 12 is pumped down to the level of sensor S1 and the signal from S1 ceases. A preestablished turn-off time delay, $t_{Doff}$, which may be about 20 seconds, control means 20 causes pump P1 to turn off; during this turn-off delay, water is pumped from the sump so that the water level is below sensor S1. Pump P1 stays turned off until is turned back on in response to the water level in sump 12 again reaching the level of sensor S1 and the pumping cycle is repeated. Of course, different pumping schedules of pump P1 could alternatively be provided by control means 20.

It is further advantageous to control the chlorination of filtered waste water in holding tank 16 by means 18 in accordance to the amount of waste water pumped into the tank by pump P1. To this end, and as depicted in FIG. 4, valve V6 may be opened and closed and pump P3 may be cycled on and off (in concert with the valve being opened and closed) for predetermined lengths of time and at predetermined intervals while pump P1 remains turned on and is thereby pumping waste water from sump 12 through filter 104 into holding tank 16. Such cyclic operation of valve V6 and pump P3 is at a rate calculated to provide the requisite chlorination of the filtered waste water in holding tank 16. For example, pump P3 may be cycled on for about two seconds about every three-four minutes of operation of pump P1 to provide the results indicated in the Example below.

Make-up fresh water may be automatically added to holding tank, by the opening of valve V8, when the water level in the tank reaches a predetermined minimum level indicated by a signal from sensor S2. Valve V8 may be left open until the water level in tank 16 reaches an intermediated level indicated by sensor S3, at which point the valve is closed and the addition of make-up water ceases.

The BACK WASH mode of operation is entered, as depicted in FIG. 4, when the delta P across filter 104 reaches a predetermined level (for example, about 9 psi) indicating that waste materials are reducing the efficiency of the filter. At that point, valves V4 and V5 are closed and back flush valves V11 and V12 are opened. Control means 20 is preferably configured (that is, microprocessor 176 is preferably programmed) so that the BACK WASH mode is not entered when pump P1 is operating. Other valves and pumps in system 10 are operated as shown in the foregoing TABLE for the BACK WASH mode of operation.

Since filtered and treated water from holding tank 16 is ordinarily needs to be supplied under pressure by pump P2 to the sources of reuse, microprocessor 176 is programmed to turn on pump P2 whenever pressure sensor 122 in conduit 112 senses a pressure drop below a preestablished level, for example, when water is flushed form toilet tank 42 or is discharged from hose bib 44. When normal operating pressure is reestablished in conduit 12, for example, when toilet flushing is completer or water is no longer drawn from hose bib 44, pump P2 is automatically turned off. Note that holding tank 16 is not required to be pressurized and normally is at ambient pressure.

In the event that the level of filtered waste water in holding tank 16 reaches a maximum level indicated by a signal from sensor S4, it is desirable to stop receiving waste water from the various sources, and valves V2A-V2D are closed and valves VIA-VID are opened so that the sources drain into drain pipe 52. This condition continues until the water level in tank 16 has been drawn down to an intermediate level signaled by sensor S3, at which time valves VIA-VID are closed and valves V2A-V2D are opened to resume the NORMAL OPERATION mode.

EXAMPLE

By way of specific example, again with no limitation being thereby intended or implied, sump 12 may have a capacity of between about 30-70 gallons, depending upon the number of waste water sources feeding into the sump and the daily amount of waste water usually produced. For example, for a large house having a number of occupants a larger-capacity sump 12 would ordinarily be used that for a smaller home with only one or two occupants. Filter 104 is preferably constructed to reduce the level of surfactants in the waste water from a normal level of about 29 Mg./liter to only about 0.04 Mg./liter, and is advantageously of a multimedia type employing gravel and carbon. Its size may, for example, be about 10 inches in diameter and about 54 inches high, but may be larger for more extensive installations. For such a filter, a back wash time of about 10 minutes, using about 50 gallons of water from tank 16 would normally be required. Typically filter 104 can be back washed a number of times and its contents would need changing (or a new filter installed about every 9-12 months. Two or more filters 104 may be connected in parallel in order to increase filtering capacity.

Holding tank 16 may have a capacity of between about 250 gallons and 1000 gallons, depending on individual household waste water production and reuse rates. For holding about 250 gallons, tank 16 may be about 42 inches in diameter and about 48 inched high.

First pump P1 may have an output of about 3-8 gallons per minute at a pressure of between about 19-25 psi and second pump P2 which may have a capacity of about 10-15 gallons per minute at a pressure of between about 25-30 psi. While these pump capacities and pressures are preferred for typical installations of system 10, it will be understood that pumps P1 and /or P2 having different capacities and pressures can alternatively be used where needed or desired.

Ideally, the amount of chlorine provided to holding tank 16 by chlorinating means 18 reduces the colaform level in the filtered waste water from filter 104 from a normal level of about 2400 mpn to only about 1.5 mpn. To achieve this result, is has been found by the present inventor that about 2 teaspoons of chlorine is usually required for each 200 gallons of waste water entering holding tank 16 from filter 104. This amount of chlorine may, of course, vary according to the condition of the waste water from filter 104 and colaform level measurements are ordinarily required to determine the amount of chlorination required. As mentioned above, pump P1 is running, pump P3 may be cycled on for about 2 seconds every 3-4 minutes.

VARIATION OF FIG. 5

The foregoing description of gray-water reclamation and reuse system 10 has assumed gravity flow of waste water into sump 12 from sources 30-36, as would be the case for the installation of system in a home or the like built on a foundation such that various pipping and valves can be installed under the house. Such a gravity-flow system 10 can also usually be made if the system is installed when a slab-floor home is under construction. In such case suitable plumbing modifications from normal plumbing installations can be made.

However, there are many instances when it is desirable to utilize system 10, and achieve at least many or most of its benefits, on preexisting, slab-floor homes. In such case, the above-described connections to sinks and washers may be possible, but will generally not be possible for first-floor shower stalls and bathtubs which rest on the slab. In such case, certain modifications are made upstream of sump 12, but downstream of sump 12 the system remains as above described.

Figure 5:
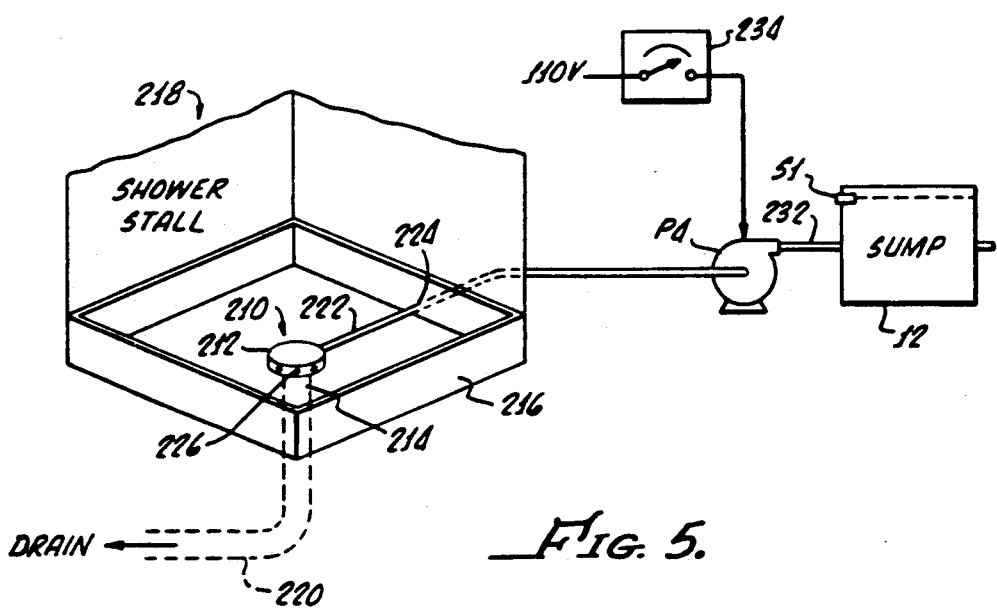
FIG. 5 is a perspective drawing showing a variation means for the providing for gray-water from an exemplary, concrete slab-mounted shower stall to the sump shown in FIG. 1 by means of a drain-plug adaptor, this variation being particularly applicable for preexisting shower stalls (or the like) installed on a concrete slab floor. In the various FIGS. like elements and features are given the same reference number and/or other identification.

As shown in FIG. 5, there is provided a suction means 210 which comprises a replacement drain stopper 212 which fits into a preexisting drain opening 214 (after the existing drain screen has been removed) in a pan portion 216 of a conventional shower stall 216, only lower regions of which are shown. With replacement drain stopper 212 so installed, shower water is prevented from running out of shower pan 216 down an associated drain pipe 220. Connected to drain stopper 212 is a flexible hose or conduit 222 which exits shower pan 216 through a side aperture 224 which is sealed around the hose. One or more water intake apertures 226 through drain stopper 212 communicate through the stopper with an inlet end of hose 222. Outside of shower stall 218 hose 222 connects to a small suction pump P4, the output of which is connected by a hose or conduit 232 to an inlet of sump 12. Preferably, suction pump P4 is controlled through a timer switch 234. When a shower is started in shower stall 218, and with drain stopper 212 in place, switch 234 is turned on and set for the estimated duration of the shower. Suction pump P4 then sucks waste water from shower pan 216 through stopper 212 and hose 22 and discharges the water through hose 232 into sump 12. Waste-water is pumped from sump 12 in the manner described above.

It can be appreciated that an arrangement similar to that just described can be used in conjunction with a bathtub to remove bath water therefrom.

The control of suction pump can be effected in ways other than through timer switch. For example, for use with shower stall 218, a small flowmeter (not shown) can be installed in the shower pipe upstream of the shower nozzle and connected to control means 20 such that a flow of water through the flowmeter causes suction pump P4 to be actuated. When the flowmeter indicates that the flow of shower water has stopped, pump P4 can be turned off after a delay sufficient to permit complete draining of shower pan 110.

Although there is described above a specific arrangement of a gray-water reuse system, and a variation thereof, in accordance with the present invention for the purpose of illustrating the manner in which the invention may be used to advantage, it will be appreciated that the invention is not limited thereto. Accordingly, any and all variations and modifications which may occur to those skilled in the art are to be considered to be within the scope and spirit of the invention as defied in the appended claims.

What is claimed is:

1. A gray-water reclamation and reuse system for collecting, filtering and storing for use waste water, said system comprising:
   a. a sump for collecting waste water;
   b. filtering means for filtering waste water collected in said sump;
   c. a tank for holding filtered waste water;
   d. means for providing waste water to said sump from one or more waste water sources, including shower stalls, bathtubs, sinks and/or clothes washers, said diverting said waste water from said one or more sources between said sump and a conventional waste water drain pipe to a sewer, septic tank or the like;
   e. first pumping means for pumping waste water from the sump into and through said filtering means and into said holding tank;
   f. second pumping means for pumping filtered waste water from said holding tank for one or more recycling uses including toilet tanks, hose bibs, and/or lawn sprinklers; and
   g. control means for controlling the operation of said first and second pumping means and said filtering means and connected for controlling said diverting means.

2. The gray-water reclamation and reuse system as claimed in claim 1, including means for chlorinating waste water held in said holding tank.

3. The gray-water reclamation and reuse system as claimed in claim 2, wherein said control means are connected for controlling said chlorination means.

4. The gray-water reclamation and reuse system as claimed in claim 1, including means enabling the adding of nonwaste water to said holding tank as make-up water.

5. The gray-water reclamation and reuse system as claimed in claim 4, wherein said non-waste water adding means include means for connecting a non-waste water supply conduit to said holding tank.

6. The gray-water reclamation and reuse system as claimed in claim 5, wherein said control means are connected for controlling said non-waste water adding means.

7. The gray-water reclamation and reuse system as claimed in claim 1, including means for back washing said filtering means.

8. The gray-water reclamation and reuse system as claimed in claim 7, wherein said back-washing means include a conduit connected between said filtering means and an existing waste water drain pipe.

9. The gray-water reclamation and reuse system as claimed in claim 7, wherein said control means are connected for controlling said back-washing means.

10. The gray-water reclamation and reuse system as claimed in claim 1, wherein said means for providing waste water to said sump include means adapted for inserting into a preexisting drain opening in a shower stall or bathtub.

11. The gray-water reclamation and reuse system as claimed in claim 1, wherein said holding tank is operated substantially at ambient pressure.

12. A gray-water reclamation and reuse system for collecting, filtering and storing for use waste water, said system comprising:
   a. a sump for collecting waste water;
   b. filtering means for filtering waste water collected in said sump;
   c. a tank for holding filtered waste water;
   d. means for chlorinating waste water held in the holding tank;
   e. means for adding of non-waste water to the holding tank as make-up water, the water adding means including means for connecting a non-waste water supply conduit to the holding tank;
   f. means for providing waste water to said sump from one or more waste water sources, including shower stalls, bathtubs, sinks and/or clothes washers, diverting said waste water from said one or more sources between said sump and a conventional waste water drain pipe to a sewer, septic tank or the like;

g. first pumping means for pumping waste water from the sump into the through said filtering means and into said holding tank;

h. second pumping means for pumping filtered waste water from said holding tank for one or more recycling uses including toilet tanks, hose bibs, and/or lawn sprinklers; and i. control means for controlling the operating of said first and second pumping means, said control means being also connected for controlling said filtering means, said diverting means, chlorination means, and said non-waste water adding means.

13. The gray-water reclamation and reuse system as claimed in claim 12, including means for back washing said filtering means, including a conduit connected between said filtering means and an existing waste water drain pipe, and wherein said control means are connected for controlling said back-washing means.

14. The gray-water reclamation and reuse system as claimed in claim 12, wherein said means for providing waste water to said sump include means adapted for inserting into a preexisting drain opening in a shower stall or bathtub.

15. A gray-water reclamation and reuse system for collecting, filtering and storing for use waste water, said system comprising:

a. a sump for collecting waste water;

b. filtering means for filtering waste water collected in said sump;

c. a tank for holding filtered waste water, said tank being operated substantially at ambient pressure;

d. means for providing waste water to said sump from one or more waste water sources, including shower stalls, bathtubs, sinks and/or clothes washers, said waste water providing means including means for diverting said waste water from said one or more sources between said sump and a conventional waste water drain pipe to a sewer, septic tank or the like;

e. first pumping means for pumping waste water from the sump into and through said filtering means and into said holding tank;

f. second pumping means for pumping filtered waste water from said holding tank one or more recycling uses including toilet tanks, hose bibs, and/or lawn sprinklers;

g. means enabling the adding of non-waste water to said holding tank as make-up water, said water adding means including means for connecting a non-waste water supply conduit to said holding tank;

h. means for back washing said filtering means, including a conduit connected between said filtering means and an existing waste water drain pipe; and i. control means for controlling the operation of said first and second pumping means, said control means being also connected for controlling said diverting means, said filtering means, said non-waste water adding means and said back-washing means.

16. The gray-water reclamation and reuse system as claimed in claim 15, including means for chlorinating waste water held in said holding tank and wherein said control means are connected for controlling said chlorination means.

17. The gray-water reclamation and reuse system as claimed in claim 15, wherein said means for providing waste water to said sump include means adapted for inserting into a preexisting drain opening in a shower stall or bathtub.

* * * * *